United States Patent
Beekman

Patent Number: 5,685,675
Date of Patent: Nov. 11, 1997

[54] OFFSET ROUTER GUIDE ASSEMBLY

[76] Inventor: Walter J. Beekman, 2066 Bradley Rd., Westlake, Ohio 44145

[21] Appl. No.: 740,843

[22] Filed: Nov. 4, 1996

[51] Int. Cl.$^6$ .................. B27C 5/00; B23C 1/20
[52] U.S. Cl. .......... 409/180; 144/136.95; 144/144.1; 144/154.5; 144/371; 144/48.6; 409/182
[58] Field of Search .................. 409/125, 126, 409/136, 135, 291, 178, 180, 182; 144/134.1, 136.95, 137, 144.1, 154.5, 371, 372, 48.6

[56] References Cited

U.S. PATENT DOCUMENTS

| | | | |
|---|---|---|---|
| 2,705,032 | 3/1955 | Pearson | 144/136.95 |
| 2,756,785 | 7/1956 | Godfrey | 144/136.95 |
| 3,981,226 | 9/1976 | White | 409/182 |
| 4,027,575 | 6/1977 | White | 144/136.95 |
| 4,044,805 | 8/1977 | Gronholz | 409/182 |
| 4,252,164 | 2/1981 | Norlander | 409/182 |
| 4,290,719 | 9/1981 | Worthington et al. | |
| 4,640,324 | 2/1987 | Lounds | 409/182 |
| 4,669,923 | 6/1987 | McKinney | |
| 4,777,991 | 10/1988 | Adame | 409/182 |
| 5,005,617 | 4/1991 | Michaels | 144/154.5 |
| 5,013,195 | 5/1991 | Strazar | 409/180 |
| 5,048,580 | 9/1991 | Smith | |
| 5,101,875 | 4/1992 | Eckhold et al. | |
| 5,445,198 | 8/1995 | McCurry | |
| 5,452,751 | 9/1995 | Engler, III et al. | |

*Primary Examiner*—W. Donald Bray
*Attorney, Agent, or Firm*—Renner, Otto, Boisselle & Sklar, P.L.L.

[57] ABSTRACT

An offset router guide assembly for guiding the movement of a router around an outer edge of a structure having corners during rough cutting of a covering material overlying the structure to provide a predetermined overlap beyond the outer edge of the structure includes a base member having an aperture for passage of a router bit, and a guide member attached to the base member by a spacer member extending between the guide member and the base member to provide a gap therebetween. The guide member has a radius greater than the radius of the router bit for offsetting the router bit a predetermined distance from the outer edge of the structure corresponding to such predetermined overlap. The spacer member has a generally triangular cross section and fits entirely within an area between the base plate and guide member bounded by wall portions of the apertures in the base member and spacer member and the intersection of two arcs with the aperture wall portions and with each other. The centers of the arcs are on diametrically opposite sides of the guide member in a plane substantially perpendicular to the normal direction of travel of the guide member with the router, and have radii substantially equal to the sum of the radii of the guide member and router bit.

22 Claims, 2 Drawing Sheets

OFFSET ROUTER GUIDE ASSEMBLY

BACKGROUND OF THE INVENTION

Widely used sink and counter tops are made of plywood, flakeboard and particle board as a substrate, and covered with a plastic laminate or solid surface material, hereafter collectively referred to as the covering or covering material. The substrate is cut to the finished size. At this time the substrate may or may not be edged with laminate, wood or solid surface material. Then the covering is cut approximately one-half inch larger all around the substrate to allow for error in assembly. This is usually accomplished by clamping and flush routing one face or section at a time. This involves considerable time and chance for error.

SUMMARY OF THE INVENTION

The present invention provides for the quick and facile rough-cutting of laminate sheets with a predetermined overhang/overlap of underlying structures without the attendant drawbacks of the previously utilized methods discussed above.

With this invention one face or section of the covering is clamped to the substrate with one-half inch overhang. Then the router is moved around the substrate leaving exactly one-half inch overhang.

This is accomplished in accordance with the invention by means of an offset router guide assembly which comprises a guide member attached to a router base plate by a spacer member, thereby defining a gap between the guide member and base plate for receipt of the laminate sheet or other covering material. The guide member has an outer peripheral surface which is situated an offset distance from the outer cutting surface of the router bit. Therefore, when rough cutting a sheet of laminate which is placed over an underlying substrate, the laminate is cut to the same general shape as the outer edge of the underlying substrate, but with a predetermined amount of laminate overlapping the edge of the structure. The amount of overlap is the distance that the offsetting surface of the guide member protrudes beyond the outer cutting surface of the router bit.

The covering material is then turned over and it and the substrate are coated with contact adhesive. When dry the covering is placed on the substrate and pressure bonded. This assembly is critical as the instant contact is made no movement is possible. Many times strips of wood are placed on the substrate to allow alignment before contact is made. The strips are removed one at a time. Then the assembly is pressure bonded. Finally the covering is finish routed as desired.

In accordance with one aspect of the invention, the portion of the spacer member that defines the gap between the base member and guide member is sized and positioned to follow in the cutting path of the router bit even while rough cutting around corners. In the preferred form of the invention disclosed herein, this is accomplished by locating the spacer member entirely within an area between the base plate and guide member bounded by the wall of an aperture in the base plate through which the router bit extends and the intersection of two arcs with the aperture wall and with each other, such arcs having their center points on diametrically opposite sides of the guide member in a plane substantially perpendicular to the normal direction of travel of the guide member with the router, and having a radius substantially equal to the sum of the radii of the guide member and router bit.

In accordance with another aspect of the invention, the cross sectional area of the spacer member approximates that of the above defined area.

In accordance with another aspect of the invention, the spacer member has a generally triangular shaped cross section.

In accordance with another aspect of the invention, one side of the spacer member is substantially tangent to the wall of the aperture in the base plate.

In accordance with another aspect of the invention, various parts of the offset router guide assembly including the base plate, guide member and spacer member are coated with a friction-reducing material which allows the rough cutting operation to be performed with less effort, prolongs the life of the parts, and reduces the chance of scratching the laminate or the underlying substrate.

In accordance with another aspect of the invention, an aperture is also provided in the guide member in alignment with and substantially of the same size as the aperture in the base plate through which the router bit extends. Such aperture in the guide member enables the router bit to be replaced without disconnecting the router guide assembly from the router. In addition, the presence of the aperture in the guide member aids in the removal of chips of cut laminate and allows the router bit to be positioned such that it extends completely through the gap between the base plate and guide member. The side of spacer member that is substantially tangent to the wall of the aperture in the base plate is also substantially tangent to the wall of the aperture in the guide member.

These and other advantages, features and aspects of the invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
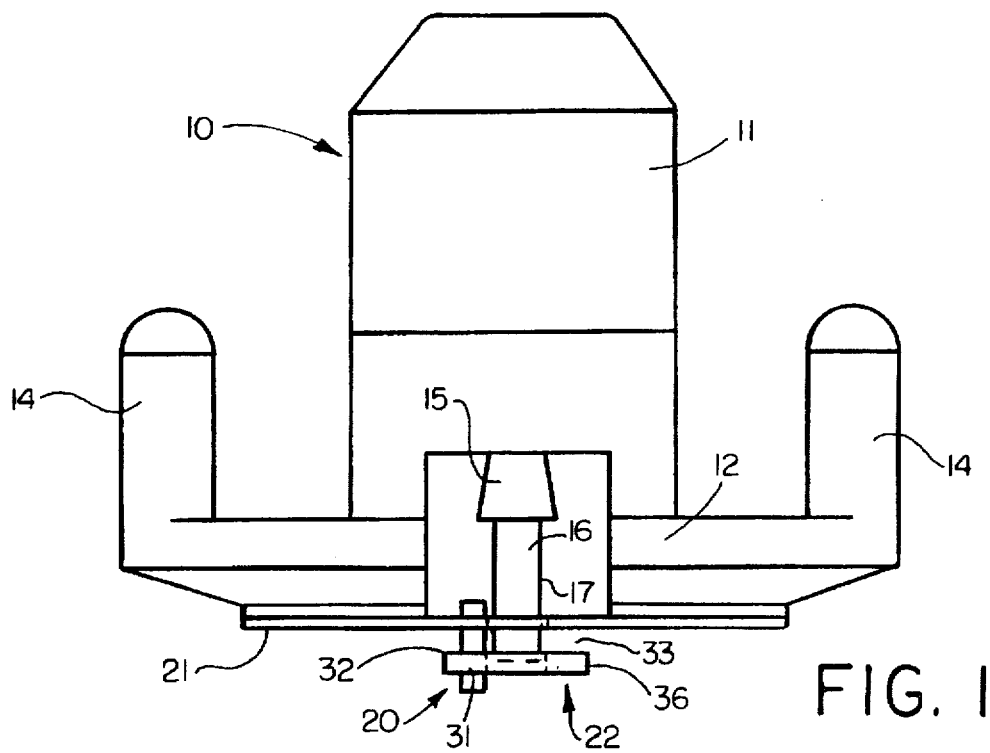
FIG. 1 is a schematic side elevation view of a conventional router having a router guide assembly of the present invention attached thereto.

Referring to FIG. 1, a hand-held router 10 of conventional type is shown. The router includes a motor 11 mounted to a base 12 which has handles 14 for supporting and guiding the router during use.

Connected to the motor arbor is a collet 15 for securing a bit 16 used to cut a workpiece (not shown). The bit has a peripheral cutting surface 17. The amount of the bit 16 which protrudes below the base 12 can be controlled by adjusting the mounting of the motor 11 to the base.

Figure 2:
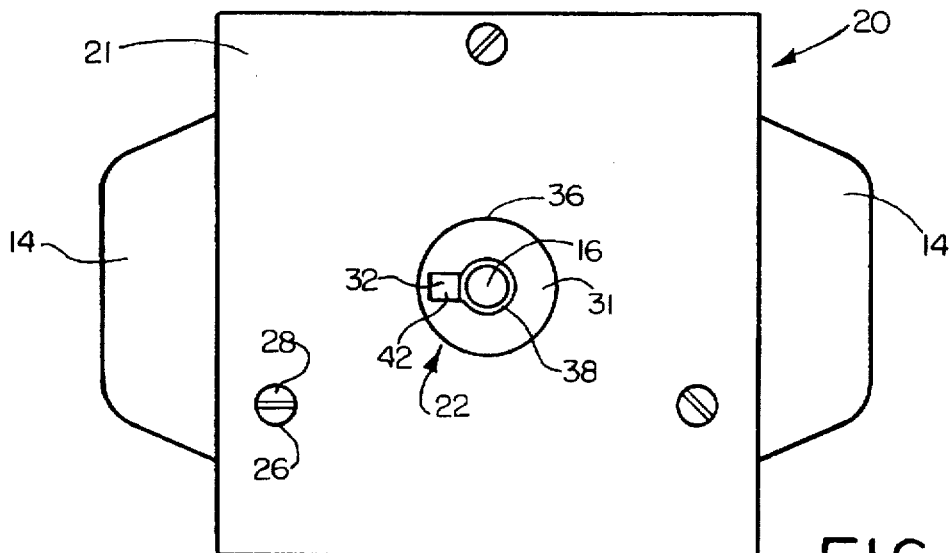
FIG. 2 is a bottom plan view of router guide assembly and router of FIG. 1.
Figure 3:
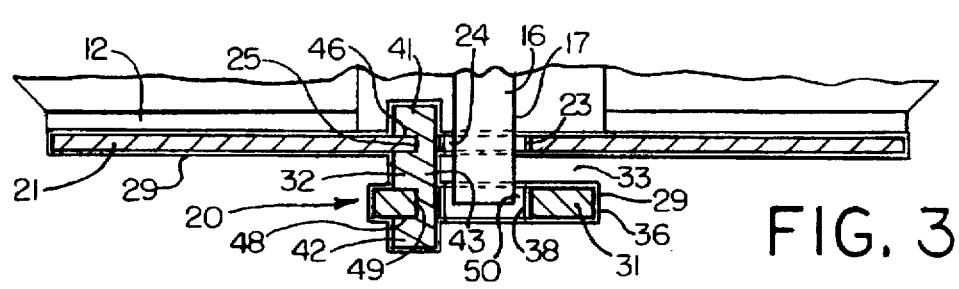
FIG. 3 is an enlarged vertical section through the router guide assembly of FIG. 1.

An offset router guide assembly 20 embodying the invention is shown in FIGS. 1 through 3, and comprises a base plate 21 removably mounted to the bottom face of the base 12 and an offset guide assembly 22 attached to the base plate as described hereafter. The base plate 21 is substantially flat and has an aperture 23 (see FIG. 3) through which the bit 16 extends. The diameter of the aperture 23 is somewhat greater than the diameter of the bit 16 (for example a diameter of approximately 0.563" for a 0.5" bit), creating a plate-bit gap 24 large enough for passage of chips from the workpiece being cut.

A notch 25 in the base plate 21 is used to attach the offset guide assembly 22 thereto. The base plate 21 has an array of holes 26, corresponding to an array of threaded holes in the base 12, so as to enable the base plate to be mounted to the base by means of screws 28 (FIG. 2). The holes 26 are countersunk on the bottom side of the plate 21 so that the heads of the screws do not protrude from the underside of the base plate when the plate is attached to the router.

The base plate 21 is preferably made of a metal such as steel. Also, it is desirable to coat the underside of the base plate, which slides across the laminate sheet during the rough cutting process, with a strong and durable coating material 29 such as a nylon powder coating that reduces sliding friction and reduces the likelihood of scratching the laminate.

The offset guide assembly 22 comprises a guide member 31 and a support 32 for attaching the guide member to the base plate 21. The guide member 31 is a substantially flat ring positioned substantially parallel to the base plate 21, thereby creating a workpiece gap 33 of sufficient dimension to allow a laminate sheet to freely enter the gap for cutting by the router bit 16. In the preferred form of the invention disclosed herein, the gap 33 is desirably approximately one-quarter inch, which will accommodate sheet material up to a thickness somewhat less than that.

Guide member 31 has an aperture 38 in coaxial alignment with and substantially the same size as the aperture 23 in the base plate 21. Such aperture in the guide member enables the router bit 16 to be replaced without disconnecting the router guide assembly 20 from the router 10. In addition, the presence of the aperture 38 in the guide member 31 facilitates removal of chips of cut laminate and allows the router bit to be positioned such that it extends completely through the gap 33 between the base plate 21 and guide member 31 and into the aperture 38 (see FIG. 3).

Figure 5:
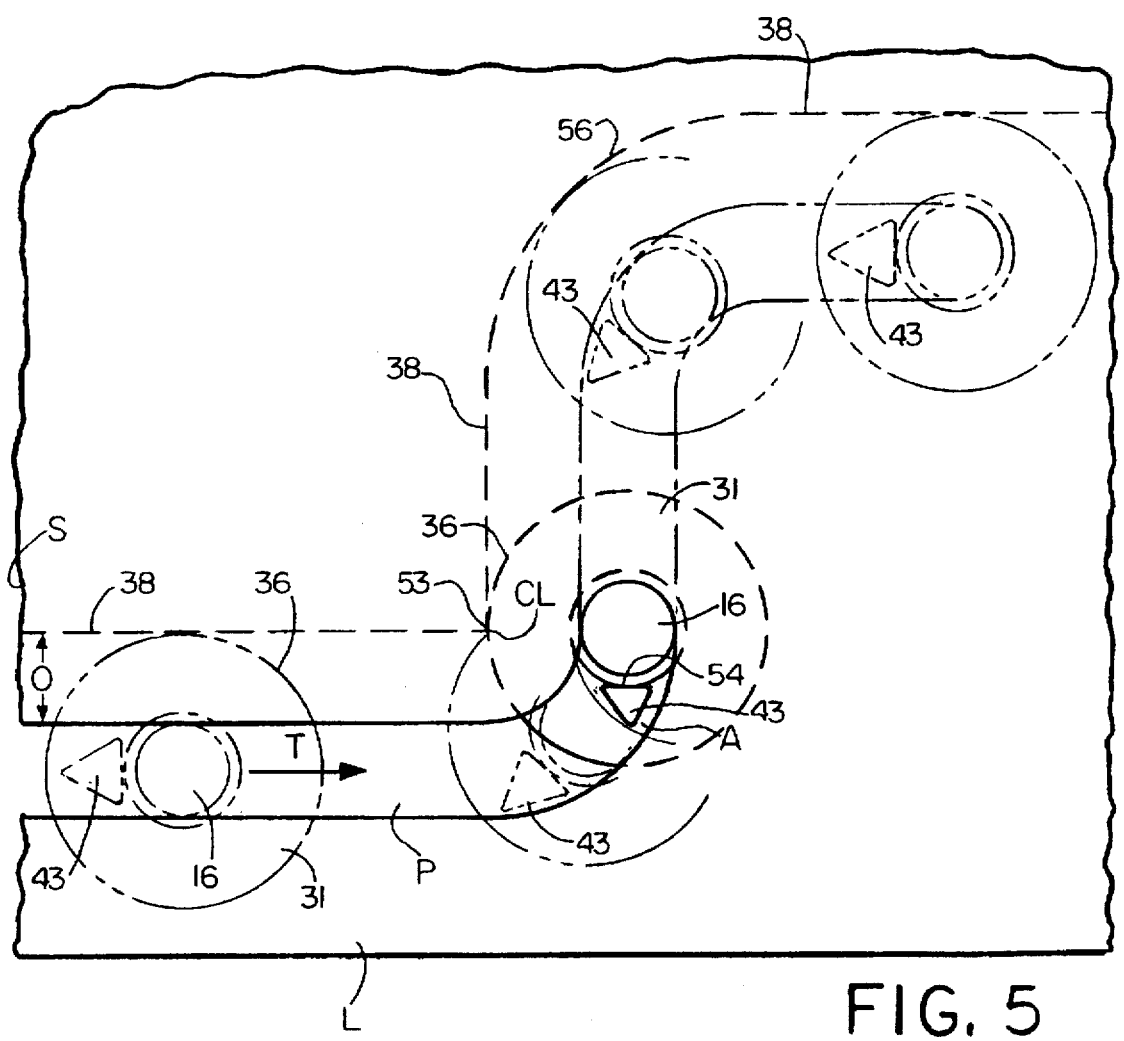
FIG. 5 is a schematic illustration of how the router guide assembly of the present invention maintains the router bit in the desired spaced relation from the outer edge of a substrate or structure during rough cutting of an overlying laminate sheet or other covering material to obtain the desired overhang of the laminate sheet beyond the outer edge of such substrate.

The guide member 31 has a peripheral surface 36 concentric with respect to the cutting surface 17 of the bit 16. When the router 10 is used for rough cutting a piece of laminate or other covering material L placed on an underlying surface S such as a countertop structure, the router is positioned with the peripheral surface 36 of the guide member 31 abutting the outer edge 38 of the underlying structure as schematically shown in FIG. 5. This results in the laminate being rough-cut so as to have a constant overhang or overlap O beyond the edge 38 of the underlying structure. The amount of overlap is the difference between the radii of the peripheral surface 36 and the bit 16. For example, using a 0.75"-radius peripheral surface 36 with a 0.25"-radius (0.5"-diameter) bit 16 produces a 0.5" overlap.

The offset guide assembly 22 disclosed herein is sized to be used with a 0.5" diameter bit. However, it will be appreciated that the guide assembly can be constructed for use with almost any size bit.

The outer surface 36 of the guide member 31 is also desirably provided with a friction-reducing coating 29 which may be of the same material as the base plate coating. For ease of manufacture, the coating 29 may be applied to all exposed surfaces of the base plate 21, guide member 31, and support 32 after these parts have been assembled.

The support 32 serves to attach the guide member 31 to the base plate 21, and includes opposite end portions 41, 42 and a spacer portion 43 therebetween. The end portions 41 and 42 are separated from the spacer portion 42 by slots 46 and 48 in the support 32 located between the portions. The upper slot 46 fits into the notch 25 in the base plate 21 such that when so installed the radial inner surface of the support 32 is substantially flush with the wall of the aperture 23 in the base plate to maintain the desired plate-bit gap 24 in the vicinity of the support. Similarly, the lower slot 48 fits into a notch 49 in the wall of the aperture 38 in the guide member 31 in substantially the same manner, thereby maintaining a guide-bit gap 50. Providing notches in the base plate and guide member and correspondingly shaped slots in the support greatly facilitate assembly of these parts and help to maintain these parts in the desired orientation and spacing. Preferably, the support 32 is attached to the guide member 31 and base plate 21 by welding the end portions 41, 42 to the top and bottom surfaces of the base plate 21 and guide member 31, respectively.

In accordance with the present invention, the spacer portion 43 of the support 32 which defines the workpiece gap 33 must fit within the path P cut by the router bit 16, even when routing around corners or other features of the underlying substrate. To that end, no dimension of its cross section can be greater than the diameter of the bit. In addition, the spacer portion 43 desirably fits entirely within an area A between the base plate 21 and guide member 31 bounded by the walls of the apertures 23 and 38 in the base plate and spacer member and the intersection of two arcs 51 and 52 with the aperture walls and with each other. Such arcs 51 and 52 have their centers (points B and C of FIG. 4) on diametrically opposite sides of the guide member 31 in a plane substantially perpendicular to the normal direction of travel T of the guide member with the router, and have radii substantially equal to the sum of the radii of the guide member 31 and router bit 16. The radius of each of the arcs 51 and 52 is equivalently expressed as the sum of the diameter of the bit 16 and the offset distance D between the peripheral surface 36 of the guide member 31 and the cutting surface 17 of the bit.

By locating the spacer portion 43 entirely within such area A, movement of the router around the corners of the underlying structure is greatly simplified. As is shown in FIG. 5, as long as the spacer or connecting portion 43 is within area A, the cutting operation around an outside corner 53 of an underlying structure can be accomplished by pivoting the router about a single contact line CL on the peripheral surface 36 of guide member 31 at the corner 53 while still keeping spacer portion 43 within the cutting path P. On the other hand, if the spacer portion 43 extends beyond area A, the router must be twisted/rotated about the axis of the router while simultaneously being moved in its path around the corner, in order to effect the cut.

The cross-sectional area of the spacer portion 43 is desirably made to closely approximate that of the area A for increased strength and longer life. For ease of manufacture, the spacer portion 43 has a generally triangular cross-sectional shape with substantially straight sides 54 which are as close to the arcs 51 and 52 of the area A as is practical. Also, one of the sides 54 of the triangular shape spacer member 43 is desirably substantially tangent to the walls of the apertures 23 and 38 in the base plate and spacer member. The corners 55 of the spacer portion 43 are desirably milled (cut) flat, for example to provide approximately 0.016" flats at the corners (see FIG. 4) to eliminate all sharp edges and to allow for easier application of a friction-reducing coating to the spacer portion.

The end portions 41 and 42 of the support 32 are desirably generally square-shaped (see FIG. 2). However, other shapes could be used as long as they have a sufficient amount of material (metal) for ease of welding the end portions to the base plate 21 and guide member 31. The outermost corners of the end portions are desirably rounded to make them less of a hazard and to improve the adherence of the applied coating.

It is unnecessary to the operation of the router guide assembly 20 that the guide member 31 provide its offsetting function a full 360° around the bit. This is due to the fact that routers are normally operated such that the cut is made as the router bit rotates away from the structure. The disadvantage in making the cut as the router bit rotates toward the structure is that the router bit will tend to push the router away from the structure. Since a router bit normally rotates clockwise as viewed from above, the router should always be moved in the same general direction during the cutting operation (e.g., from left to right as viewed in FIG. 5). Accordingly, providing the guide member 31 with a peripheral surface 36 that is slightly greater than 180° will be fully effective in providing the desired 0.5" overlap around the outer edge of the structure during the rough cutting operation.

Figure 4:
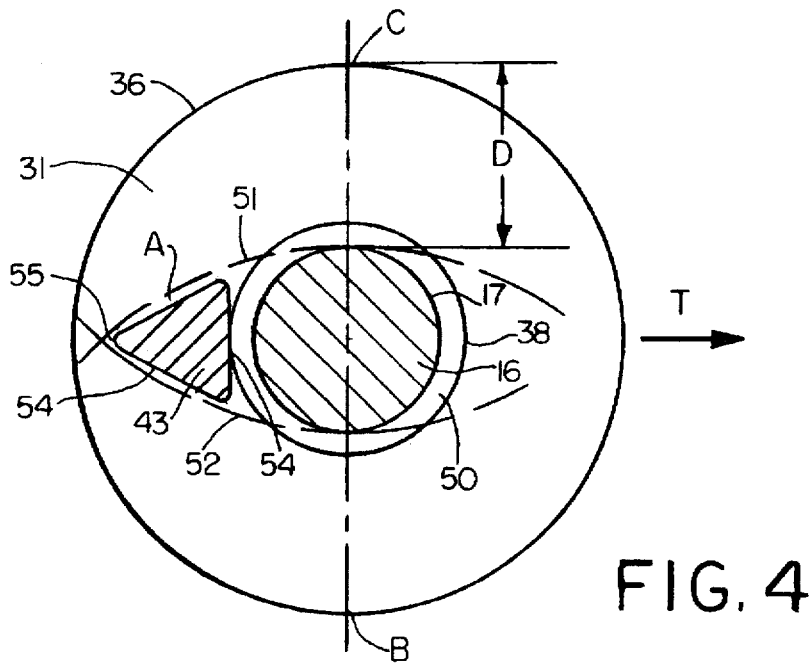
FIG. 4 is an enlarged schematic transverse section through the spacer portion of the router guide assembly of FIG. 1.

For making inside cuts, it will be appreciated that even with the spacer portion 43 entirely within area A as shown in FIG. 4, some twisting/turning of the router about its axis will be necessary when rough cutting in the vicinity of an inside corner 56 of the underlying structure. It is desirable to minimize the amount of twisting/turning needed to accomplish such a cut, while still maintaining as much cross-sectional material as possible in the middle portion of the support, in order to keep the guide member rigidly attached to the base plate. It will be appreciated that when the rough cutting router operation is performed, the turning of the router in maneuvering through an inside corner region will always be in a clockwise direction as viewed from above the router. Therefore, only one side of the spacer portion 43 of the support 32 (the side closest to the inside corner when making inside cuts) will tend to control the amount of rotation of the router which can be accomplished without having the spacer portion 43 contact the edges of the path P cut by the router bit. For making outside cuts, the opposite side of the spacer portion will tend to control the amount of rotation of the rotor.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A guide assembly for guiding the movement of a router around an outer edge of a structure having corners during rough cutting of a covering material overlying the structure to provide a predetermined overlap of the covering material beyond the outer edge of the structure comprising a base member adapted to be affixed to a bottom surface of the router, said base member having an aperture for passage of a router bit through said base member when affixed to the router, and a guide member attached to said base member by a spacer member extending between said guide member and said base member to provide a gap therebetween for receipt of the covering material, said guide member having an arcuate surface with a radius greater than the radius of the router bit for offsetting the router bit a predetermined distance from the outer edge of the structure corresponding to such predetermined overlap, said spacer member being located adjacent a wall portion of said aperture in said base member inwardly of an arc having a center point at an intersection of said arcuate surface of said guide member with a plane passing through the center axis of said arcuate surface and having a radius equal to the sum of the radii of said arcuate surface and the router bit.

2. The guide assembly of claim 1 wherein said arcuate surface extends over at least 180°.

3. The guide assembly of claim 1 wherein said arcuate surface extends 360°.

4. The guide assembly of claim 1 wherein said guide member is a ring shaped member having an aperture in axial alignment with the aperture in said base member and of substantially the same diameter, and said spacer member has one side substantially tangent to both of said apertures.

5. The guide assembly of claim 1 wherein said spacer member has one side closely adjacent said arc.

6. The guide assembly of claim 1 wherein said spacer member is located within an area defined by the intersection of said arc and a second arc having a center point on a continuation of said arcuate surface of said guide member diametrically opposite the center point of said arc with each other and with said wall portion of said aperture, said second arc having a radius equal to the sum of the radii of said arcuate surface and the router bit.

7. The guide assembly of claim 6 wherein said spacer member has sides closely adjacent said arcs and said wall portion of said aperture.

8. The guide assembly of claim 7 wherein one of said sides of said spacer member is substantially tangent to said wall portion of said aperture.

9. The guide assembly of claim 7 wherein said spacer member has a generally triangular shaped cross section.

10. The guide assembly of claim 1 wherein said guide member has an aperture in axial alignment with the aperture in said base member, said aperture in said guide member having a diameter larger than the router bit for receipt of the router bit.

11. The guide assembly of claim 10 wherein said apertures in said base member and said guide member are of substantially the same diameter.

12. The guide assembly of claim 1 wherein said base member has a lower surface coated with a friction reducing material.

13. The guide assembly of claim 1 wherein said arcuate surface of said spacer member is coated with a friction reducing material.

14. The guide member of claim 1 wherein said spacer member has a substantially triangular shaped cross section.

15. A guide assembly for guiding the movement of a router around an outer edge of a structure having corners during rough cutting of a covering material overlying the structure to provide a predetermined overlap of the covering material beyond the outer edge of the structure comprising a base member adapted to be affixed to a bottom surface of the router, said base member having an aperture for passage of a router bit through said base member when affixed to the router, and a guide member attached to said base member by a spacer member extending between said guide member and said base member to provide a gap therebetween for receipt of the covering material, said guide member having an arcuate surface with a radius greater than the radius of said aperture in said base member, said spacer member being located adjacent a wall portion of said aperture, said spacer member having a generally triangular cross section.

16. The guide assembly of claim 15 wherein said spacer member has an aperture of substantially the same diameter as the aperture in said base member and in axial alignment therewith.

17. The guide assembly of claim 16 wherein said apertures in said base member and said guide member have aligned notches for receipt of end portions of said spacer member.

18. The guide assembly of claim 16 wherein said spacer member has a side that is substantially tangent to said apertures in said base member and said spacer member.

19. A router comprising a base, a motor mounted to said base for driving a router bit, and a guide assembly for guiding the movement of said router around an outer edge of a structure having corners during rough cutting of a covering material overlying the structure to provide a predetermined overlap of the covering material beyond the outer edge of the structure, said guide assembly comprising a base member affixed to a bottom surface of said base of said router, said base member having an aperture through which said router bit extends, and a guide member attached to said base member by a spacer member extending between said guide member and said base member to provide a gap therebetween for receipt of the covering material, said guide member having an arcuate surface with a radius greater than the radius of said router bit for offsetting said router bit a predetermined distance from the outer edge of the structure corresponding to such predetermined overlap, said spacer member being located adjacent said aperture in said base member on a side opposite the normal direction of travel of said guide assembly with said router, said spacer member having a generally triangular cross section.

20. The router of claim 19 wherein said spacer member is located within an area between said base member and said guide member bounded by a wall portion of said aperture in said base member and the intersection of two arcs with said wall portion and with each other, said arcs having centers on diametrically opposite sides of said guide member in a plane substantially perpendicular to the normal direction of travel of said guide assembly with said router, and radii substantially equal to the sum of the radii of said arcuate surface and said router bit.

21. The router of claim 19 wherein said spacer member has sides closely adjacent said arcs and said wall portion of said aperture.

22. The router of claim 19 wherein said guide member is generally ring shaped and has an aperture of substantially the same diameter as the aperture in said base member and in axial alignment therewith, said router bit extending through said gap between said base member and said guide member and into said aperture in said guide member.

* * * * *